United States Patent [19]

Oe

[11] Patent Number: 5,031,620

[45] Date of Patent: Jul. 16, 1991

[54] IMAGE PROCESSING APPARATUS

[75] Inventor: Mithuo Oe, Ootawara, Japan

[73] Assignee: Kabushiki Kaisha Toshiba, Kawasaki, Japan

[21] Appl. No.: 121,638

[22] Filed: Nov. 13, 1987

[30] Foreign Application Priority Data

Nov. 14, 1986 [JP] Japan .................................. 61-272369

[51] Int. Cl.$^5$ ............................................... A61B 6/00
[52] U.S. Cl. .............................. 128/653 R; 358/111;
378/99; 364/413.24
[58] Field of Search .................... 128/653 R; 358/111;
364/413-423; 378/99

[56] References Cited

U.S. PATENT DOCUMENTS

| 4,323,973 | 4/1982 | Greenfield | 358/111 |
| 4,355,331 | 10/1982 | Georges et al. | 358/111 |
| 4,450,478 | 5/1984 | Ledley | 358/111 |
| 4,598,368 | 7/1986 | Umemura | 358/111 |
| 4,794,531 | 12/1988 | Morishita et al. | 358/111 |
| 4,802,093 | 1/1989 | Ema | 364/413.23 |
| 4,827,492 | 5/1989 | Klausz | 358/111 |

OTHER PUBLICATIONS

"Basic Concepts of Digital Subtraction Angiography", Kruger and Riederer, G. K. Hall Medical Publishers, Boston, 1984, p. 192.

Primary Examiner—Lee S. Cohen
Assistant Examiner—John D. Zele
Attorney, Agent, or Firm—Oblon, Spivak, McClelland, Maier & Neustadt

[57] ABSTRACT

An image processing apparatus having an image output device for delivering a mask image signal and a contrast image signal corresponding to a mask image and contrast image, and having a subtraction processor for out-putting a subtraction image signal resulting from the subtraction of the mask image signal from the contrast image signal. The mask image signal and subtraction image signal are stored in corresponding frame memories, respectively. A divider divides the mask image signal, which has been stored in the frame memory, by a constant, producing a level-down mask image signal output. An adder adds together the level-down mask image signal and the subtraction image signal to obtain a landmark image signal. A display section, upon receipt of the landmark image signal, displays, in a superimposed fashion, a subtraction image against the background of a thin mask image.

12 Claims, 4 Drawing Sheets

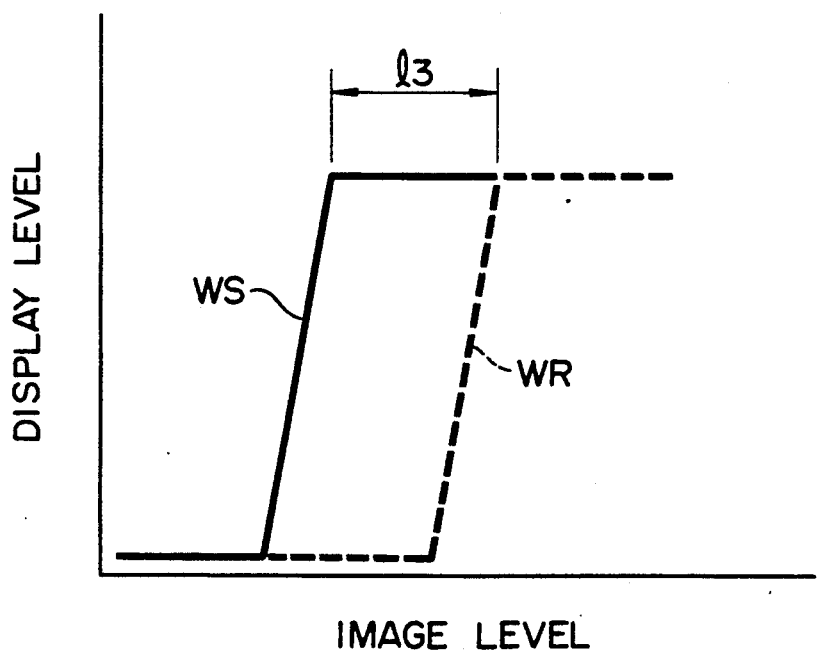
F I G. 4

IMAGE PROCESSING APPARATUS

Background of the Invention

This invention relates to an image processing apparatus for processing images of two different types obtained from the same region of interest and, in particular, to an image processing apparatus using a subtraction method.

An image processing apparatus using a subtraction method is adapted to process an image based on data obtained from an X-ray diagnostic system or ultrasonic diagnosis apparatus, or FID data obtained by an NMR, so that a useful image can be reconstructed for medical diagnosis.

The X-ray diagnostic system, for example, is adapted to subtract a mask image, obtained prior to the injection of a contrast medium into a region of interest of a human subject, from a superimposed image (contrast image) of an angiographic and mask image obtained subsequent to the injection of the contrast medium, and to eliminate the mask image from the superimposed image and hence to extract a subtraction image; that is, an image of blood vessels alone. In this way, it is possible to obtain a blood vessel image of high contrast. However, since the anatomical position of any imaged region cannot be determined simply on the basis of observing a blood vessel image, a landmark image is displayed, if required, with the mask image superimposed, as a background, on the subtraction image. In the case of the landmark image, the image level of the blood vessel portion at the subtraction image is lower than that of the mask image, thereby rendering the blood vessel portion visually ill-defined if the two images are superimposed relative to each other.

SUMMARY OF THE INVENTION

It is accordingly the object of this invention to provide an image processing apparatus which can display a landmark image which enables clear recognition of blood vessels.

An image processing apparatus according to this invention includes dividing means for dividing a mask image signal by a predetermined constant and for outputting a level-down mask image signal, and means for outputting a landmark image signal.

The image processing apparatus of this invention includes a window processing circuit for subjecting a landmark image signal to window processing, so that the landmark image level may be enhanced.

BRIEF EXPLANATION OF THE DRAWINGS

FIG. 4 is a graph showing the window level of a window circuit of FIG. 2;

DETAILED DESCRIPTION OF THE PREFERRED EMBODIMENT

Figure 1:
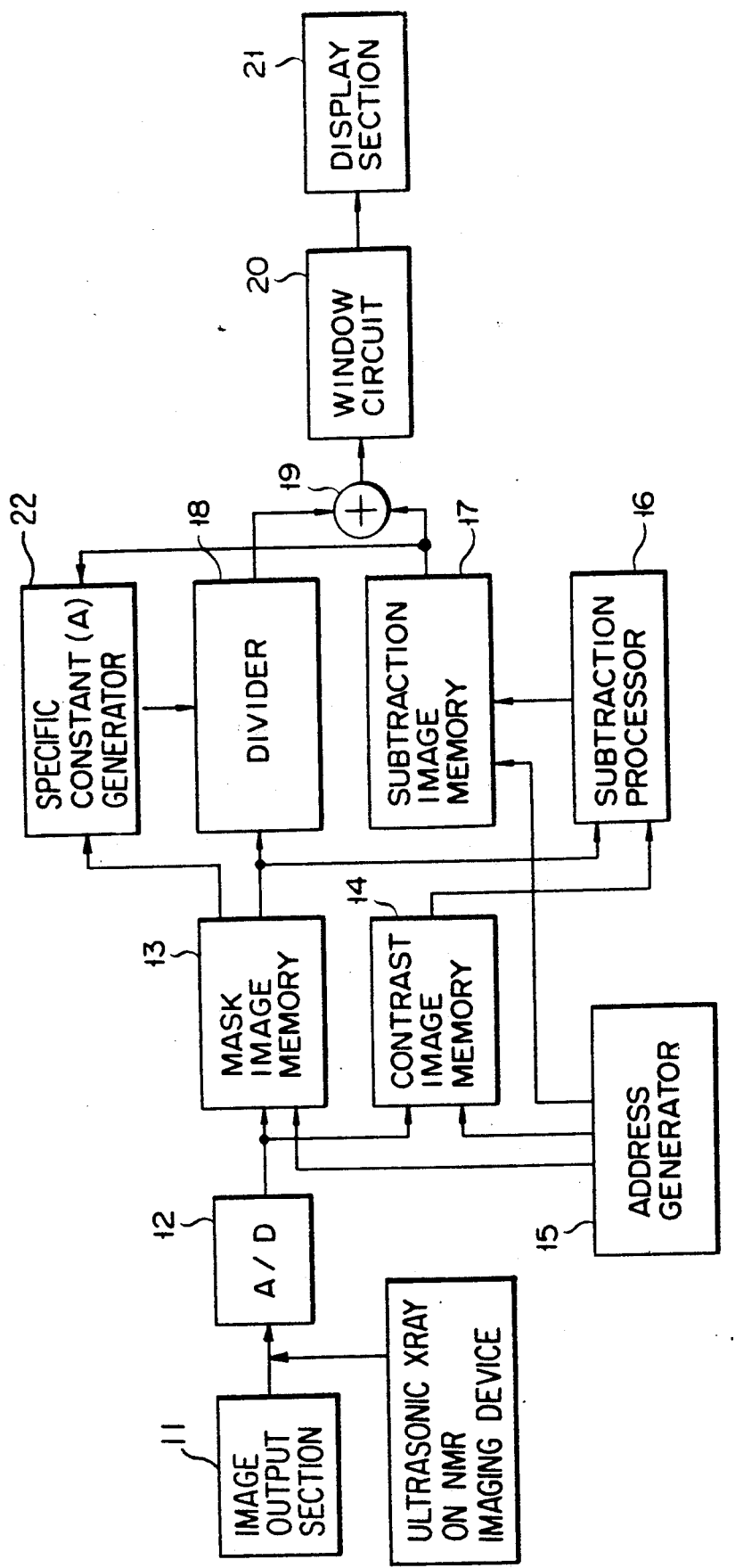
FIG. 1 is a block circuit diagram showing an image processing apparatus according to one embodiment of this invention.

Referring to FIG. 1, image output section 11 comprises, for example, an X-ray television device for generating an X-ray image signal, an ultrasonic imaging device or an NMR device. Image output section 11 has its output terminal connected to the input terminal of A/D converter 12. A/D converter 12 converts, to a digital image signal, an analog image signal which is output from image output section 11.

The output terminal of A/D converter 12 is connected to the write-in terminals of mask image memory (frame memory) 13 and contrast image memory (frame memory) 14. Mask image memory 13 stores, as a mask image, an X-ray image obtained prior to the injection of a contrast medium into a region of interest of a human subject, that is, an X-ray image of the skeleton only. Contrast image memory 14 stores, as a contrast image, an X-ray image obtained after the injection of the contrast image into the ROI of the human subject, that is, a superimposed image of skeleton and blood vessel images. Memories 13 and 14 have their address terminals connected to the output terminals of address generator 15 and store an image signal from A/D converter 12 in accordance with address data from address generator 15. The readout terminals of mask image memory 13 and contrast image memory 14 are connected to the input terminals of subtraction processor 16. Subtraction processor 16 processes image signals of frame memories 13 and 14 so as to obtain an image of the blood vessel region only, that is, a subtraction image, through a subtractive process between the mask image and the contrast image.

Subtraction processor 16 has its output terminal connected to the write-in terminal of subtraction image memory 17. Subtraction image memory (frame memory) 17 writes a subtraction image signal in accordance with an address signal from address generator 15.

Mask image memory 13 has its output terminal connected to the input terminal of divider 18. The divider divides a mask image signal by a constant A to lower the image level of the image signal read out of mask image memory 13.

Subtraction image memory 17 and divider 18 have their output terminals connected to the input terminals of adder 19. In order to obtain a landmark image signal, the adder additively combines the mask image signal and subtraction image signal. The output of adder 19 is connected to the input terminal of window circuit 20. In order to provide the most readily observable image as the landmark image, window circuit 20 processes the landmark image signal with a desired area of the landmark image level-enhanced. The output terminal of window circuit 20 is connected to the input terminal of display section 21.

The operation of the image processing apparatus thus configured will be explained below.

First, the ROI of the human subject is X-rayed prior to the injection of a contrast medium into the subject ROI and a mask image signal is output from image output section 11 to A/D converter 12 where it is converted to a digital mask image signal. The digital mask image signal is stored in mask image memory 13. Then, the human subject is X-rayed with the contrast medium injected into the blood vessel, at which time the image output section 11 delivers a contrast image signal first to the A/D converter 12 and then to contrast image memory 14 where it is stored.

The image signals of mask image memory 13 and contrast image memory 14 are input to subtraction processor 16 where a mask image signal is subtracted from the contrast image signal. The subtraction processor delivers a subtraction image signal to subtraction image memory 17.

Figure 2:
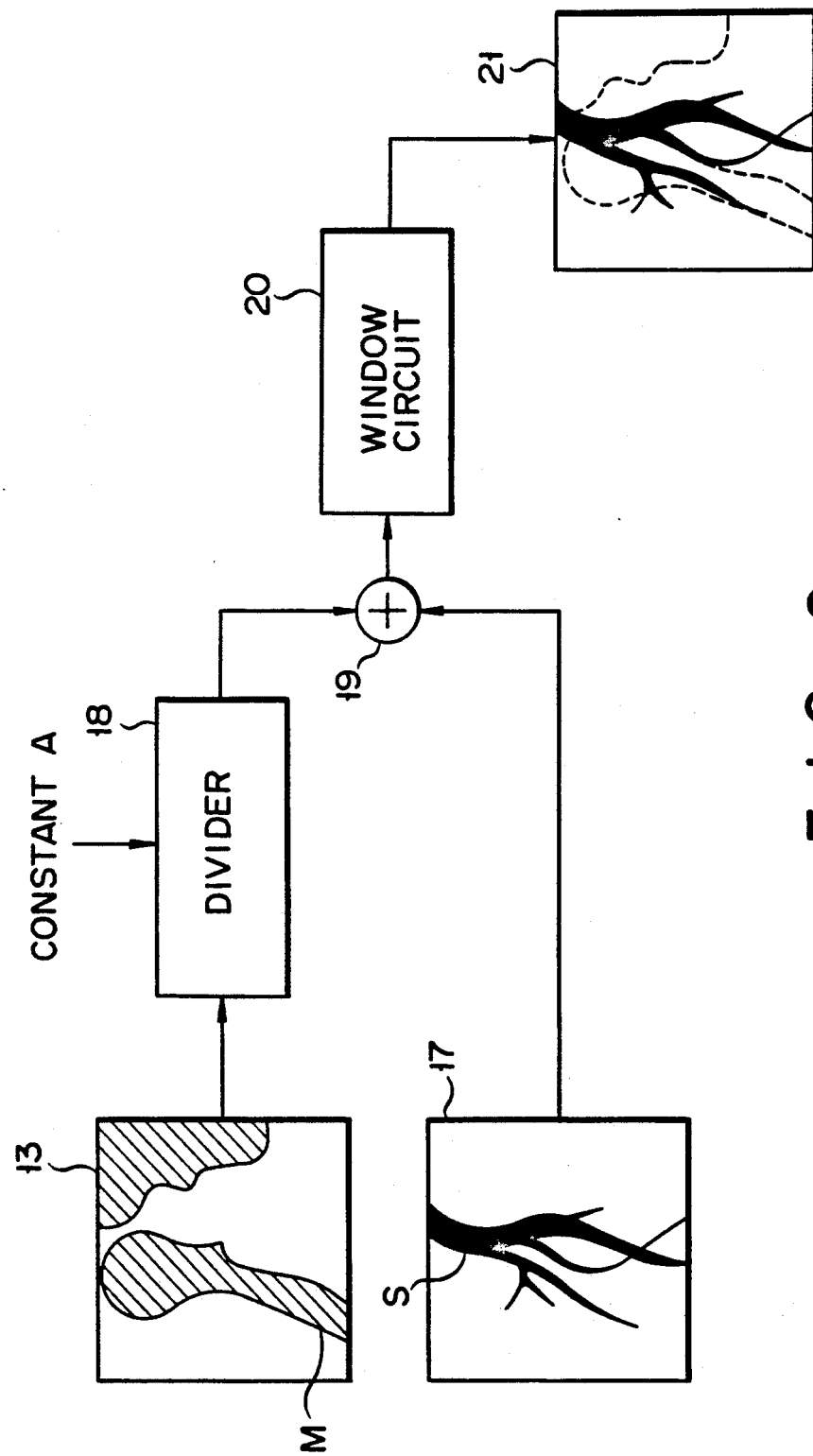
FIG. 2 is a circuit diagram showing in a graphic mode the major parts of the apparatus of FIG. 1.

The mask image 13A stored in mask memory 13 and subtraction image of subtraction image memory 17 are as shown in FIG. 2. That is, the mask image shows a skeleton M only and subtraction image 17a shows a blood vessel image S only.

The mask image signal is input to divider 18 where it is divided by a constant A outputted from a specific constant generator 22 a reduction image signal, noting that the constant A is determined to have a ratio of the mask image signal level to the subtraction image signal level of approximately 1:1, preferably a ratio of an average of the values of picture elements of the mask image to a maximum value of picture elements of the subtraction image of approximately 1:1.

Figure 3:
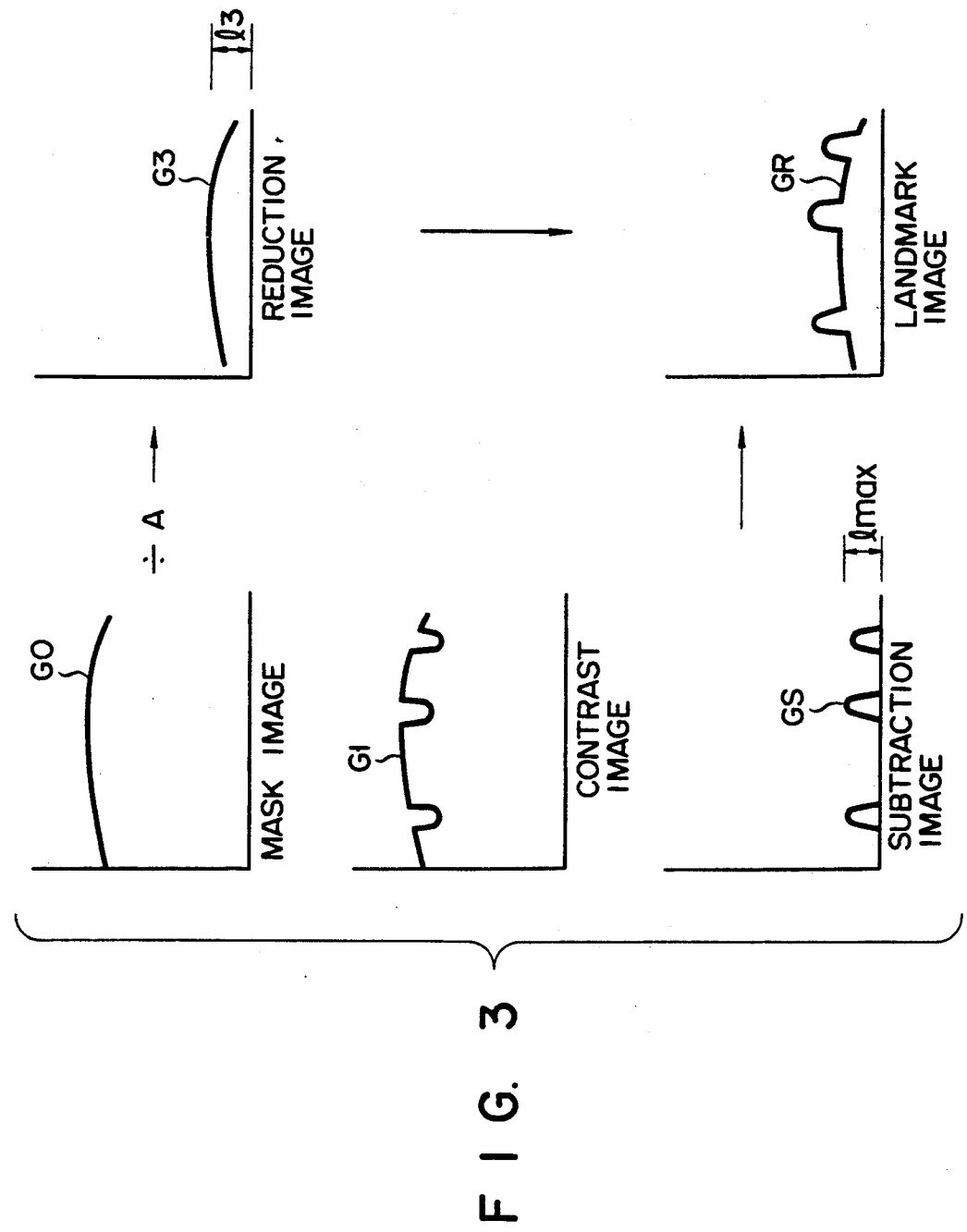
FIG. 3 shows the level distribution of image signals obtained from the circuit of FIG. 2.

The mask image, contrast image and subtraction image are plotted as profiles G0, G1 and GS in FIG. 3. The mask image processed by divider 18 has the profile G3. That is, through the division of the profile G0 by the constant A the mask image is converted to a level l 3.

The landmark image of a profile GR is obtained through the addition of the level down mask image signal of the profile G3 and subtraction image signal of the maximum level l max. As set out above and as will be appreciated from FIG. 3, the levels l 3 and l max have a relation of approximately 1:1. Thus the landmark image provides a well-balanced superimposition image of the level-down mask image and subtraction image so that the most readily observable blood vessel image can be displayed, as a screen image, against the background image as set forth below. In order to determine the constant A for a 1:1 level ratio to be obtained between the mask image and the subtraction image, the contrast level of the mask image can be controlled by varying the constant A by an input means, such as a track ball, while viewing that mask image on the monitor screen of display section 21. The image 21A displayed on display section 21 is a result of the sum of signals obtained from divider 18 and image memory 17 following processing by window circuit 20. The landmark image of the profile GR is input to window circuit 20 for window processing. In order to display a subtraction image by the window processing, the window level is set to a value WS in FIG. 4 with the profile $G_S$ of the blood vessel most enhanced. The term "window level" refers to the range of the image signal level. When only the subtraction image is displayed, the window level is set at a predetermined value.

If, on the other hand, the landmark image is to be displayed, the window level is increased so that the subtraction image is enhanced in level. It is preferred that the subtraction image be enhanced by the level l 3 as indicated by WR in FIG. 4 because the level of ROI at the blood vessel has its mask image (from divider 18) enhanced by the level l 3 as in $G_R$.

The image can be clearly observed by an operator through the correction of the window level as set out above, when change is made to the landmark image relative to the window level at the time of displaying the subtraction image.

The landmark signal obtained by adding the mask image signal of the profile G3 to the subtraction image signal of the maximum level l max is supplied to the window circuit 20. When the subtraction image signal is displayed, the window level is set at a value WS, to delete the mask image signal from the landmark signal.

When the landmark signal is displayed, the window level is set at the level WR enhanced by level l 3 from the level WS. The level l 3 is determined so as to be equal to the level l max.

The image signal subjected by window circuit 20 to a window processing is input to display section 21 where a subtraction image S is displayed in a fashion superimposed with a mask image M as the background image. Since the mask image M is displayed as a low tone image, the mask image, that is, the background image (skeleton image) and subtraction image (blood vessel image) can be recognized at their relative position.

As a practical application, if with a signal of a level l 3 displayed in blue color a signal (blood vessel component) exceeding the level 13 is supplied to a color TV and can be displayed as a different colored image on the screen. The use of a color display further improves the identification of a region of interest (at the blood vessel) against the background.

The subtraction image can be superimposed on the mask image by subjecting the blood vessel contour of the subtraction image to a level-enhancing process, such as a Sobel filter process. The image superimposition can be performed in a graphics fashion through the extraction of the blood vessel profile.

In the aforementioned embodiment, although the two different images have been explained as being obtained prior to and subsequent to the injection of the contrast medium into the blood vessel, two different data obtained from a specific region of interest can be recognized in a relative fashion. Furthermore, two or more kinds of images can be superimposed relative to each other. This invention can be applied not only to digital image signals but also to analog image signals.

Although, in the aforementioned embodiment, the image signals have been explained as the X-ray image signals, input image signals can be used as various image signals, such as ultrasonic image signals and NMR image signals.

What is claimed is:

1. An image processing apparatus comprising:
   image output means for outputting at least first and second image signals corresponding to at least two different images of a region of interest of a subject, said first and second image signals having respective intensity levels;
   memory means connected to said image output means, for storing said first and second image signals;
   means for generating a specific constant for lowering the intensity level of said first image signal;
   signal processing means for arithmetically processing by the specific constant said first image signal read out of said memory means, to obtain a level-down first image signal;
   subtraction means, connected to image and said memory means, for subtracting said first image signal from said second image signal, to obtain a subtraction image signal; and
   landmark image output means connected to said signal processing means and said subtraction means, for adding the level-down first image signal to the subtraction signal, to obtain a landmark image signal.

2. An image processing apparatus according to claim 1, wherein said image output means comprises x-ray television means for x-raying the subject, for outputting said first image signal, corresponding to an x-ray mask image, prior to an injection of a contrast medium into said region of interest, and for outputting said second signal corresponding to an x-ray contrast image subsequent to the injection of said contrast medium into said region of interest.

3. An image processing apparatus according to claim 2, wherein said memory means comprises a first frame memory for storing said first image signal and a second frame memory for storing said second image signal, said first and second frame memories being connected to said subtraction means for outputting said subtraction signal corresponding to the difference between the first and second image signals which are stored in said first and second image memories.

4. An image processing apparatus according to claim 3, wherein said subtraction means includes a frame memory for storing said subtraction signal.

5. An image processing apparatus according to claim 1, wherein said signal processing means comprises dividing means for dividing by the specific constant the first image signal read out of said memory means.

6. An image processing apparatus according to claim 1, further comprising:
means for determining said specific constant so as to set a ratio of an average level of said first image signal with respect to a maximum level of said subtraction image signal to approximately 1:1.

7. An image processing apparatus according to claim 1, wherein said signal processing means comprises means for dividing said first image signal by said specific constant such as to set a ratio of a maximum value of said subtraction image signal to an average of values of said first image signal to 1:1.

8. An image processing apparatus according to claim 1, wherein said landmark image output means comprises:
an adder means for adding said level-down first image signal to said subtraction image signal, to form the landmark image signal, and window means for adjusting the level of said landmark image signal obtained from said adder.

9. An image processing apparatus according to claim 8, which includes display means for displaying the landmark image, and wherein said window means includes means for bringing the landmark image signal produced by said landmark image output means to a higher level than that of said subtraction image signal, when said landmark image signal is displayed by said display means.

10. An image processing apparatus according to claim 1, wherein said landmark image output means includes means for displaying said landmark image signal including a mask image of a low tone and a subtraction image.

11. An image processing apparatus according to claim 1, wherein said image output means comprises an ultrasonic image output means for outputting an ultrasonic image signal.

12. An image processing apparatus according to claim 1, wherein said image output means comprises means for outputting an NMR image signal.

* * * * *